(12) United States Patent
Elliott et al.

(10) Patent No.: US 9,324,196 B2
(45) Date of Patent: Apr. 26, 2016

(54) SELF-SERVICE VEHICLE DIAGNOSTIC TESTING

(71) Applicant: HTI IP, LLC, Arlington, VA (US)

(72) Inventors: Bryant Elliott, Johns Creek, GA (US); Eric Berkobin, Woodstock, GA (US)

(73) Assignee: Verizon Telematics Inc., Atlanta, GA (US)

( * ) Notice: Subject to any disclaimer, the term of this patent is extended or adjusted under 35 U.S.C. 154(b) by 0 days.

(21) Appl. No.: 14/219,781

(22) Filed: Mar. 19, 2014

(65) Prior Publication Data

US 2015/0269788 A1    Sep. 24, 2015

(51) Int. Cl.
*G07C 5/00* (2006.01)
*G06Q 20/18* (2012.01)
*B60R 16/023* (2006.01)
*H01R 13/66* (2006.01)

(52) U.S. Cl.
CPC ............... *G07C 5/008* (2013.01); *G06Q 20/18* (2013.01)

(58) Field of Classification Search
CPC ...................... B60R 16/0232; H01R 13/6658
See application file for complete search history.

(56) References Cited

U.S. PATENT DOCUMENTS

2012/0258627 A1* 10/2012 Huang .................... 439/620.21

* cited by examiner

*Primary Examiner* — Fadey Jabr
*Assistant Examiner* — Basil T Jos

(57) ABSTRACT

Vehicle diagnostic tests may be performed by an owner of a vehicle on a self-serve basis. In one implementation, a method may include communicating, by a vehicle diagnostic device, with a vehicle through an OBD connector of the vehicle, to obtain diagnostic information relating to operation of the vehicle. The method may further include receiving instructions relating to the obtaining of the diagnostic information and playing, via a speaker associated with the vehicle diagnostic device, the instructions as audible instructions.

19 Claims, 7 Drawing Sheets

SELF-SERVICE VEHICLE DIAGNOSTIC TESTING

BACKGROUND

The term "On-Board Diagnostics" (OBD) refers to a computer-based monitoring system built into vehicles. For example, in the United States, model year 1996 and newer light-duty cars and trucks include OBD systems. The OBD system may monitor the performance of some of an engine's components. For example, an OBD system may provide vehicle owners with an early warning of malfunctions by way of a dashboard "Check Engine" light.

Vehicles equipped with an OBD system may include a standardized hardware interface port (e.g., an OBD port) through which an external device may be connected. The device may communicate with the OBD system to receive diagnostic information relating to the operation of the vehicle.

Emissions of air pollutants from motor vehicles have been shown to have a variety of negative effects on public health. Accordingly, many jurisdictions require that vehicle operators periodically have their vehicle tested to verify that the vehicle complies with emissions standards. A vehicle's OBD system may be used to implement vehicle emission inspections. For example, an OBD inspection device may be connected to a vehicle through the OBD port of the vehicle. The OBD inspection device may then receive diagnostic information, such as information relating to the operational state of emission control components within the vehicle. The diagnostic information may be used to determine whether the vehicle complies with emission standards.

DETAILED DESCRIPTION OF PREFERRED EMBODIMENTS

The following detailed description refers to the accompanying drawings. The same reference numbers in different drawings may identify the same or similar elements.

Techniques described herein may provide for vehicle diagnostic tests that can be performed by an owner of a vehicle on a self-serve basis. In one implementation, a device (referred to as a "vehicle diagnostic device" herein) to automatically obtain diagnostic information, from an OBD port of a vehicle, may be enclosed in a rugged housing and may be provided to vehicle owners from a self-serve vending machine or kiosk. The vehicle owner may be given instructions on how to use the vehicle diagnostic device. For example, instructions may be provided through a graphical interface associated with the kiosk and/or via audible instructions generated by the vehicle diagnostic device or by Bluetooth (or equivalent) to a mobile phone, device, or tablet. In response to obtaining diagnostic information from the owner's vehicle, the vehicle diagnostic device may transmit the diagnostic information to the kiosk (such as via a wireless interface, such as Bluetooth®) or to a remotely located server (such as via a cellular wireless interface). The vehicle diagnostic device and/or the kiosk may then inform the vehicle owner of results associated with the diagnostic information.

In one implementation, the diagnostic information may be obtained as part of a vehicle emissions test. The kiosk and/or the vehicle diagnostic device may inform the owner whether their vehicle passed the emissions test. In this manner, vehicle emission tests may be implemented in a self-serve manner.

Figure 1:
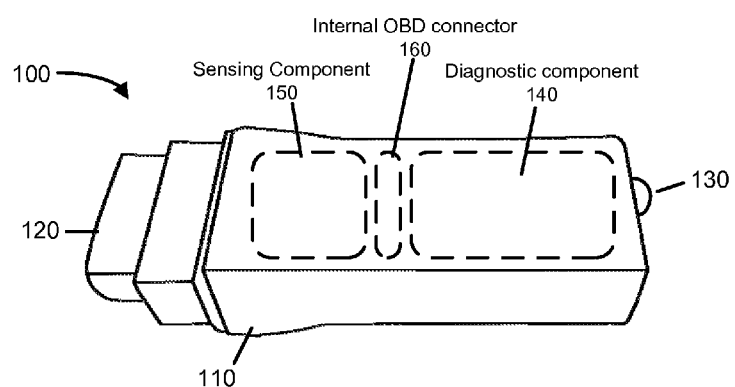
FIG. 1 is a diagram illustrating a perspective view of an example of a vehicle diagnostic device.

FIG. 1 is a diagram illustrating a perspective view of an example of a vehicle diagnostic device 100. Vehicle diagnostic device 100 may include electronic components contained in rugged housing 110. Rugged housing 110 may include a polycarbonate material or some other material designed to withstand relatively rough handling by users. For example, it may be assumed that users may drop vehicle diagnostic device 100 onto hard (e.g., concrete) floors. The inside of rugged housing 110 may include a shock pad material, such as Poron®, or another foam or foam-like material that may provide cushioning to electronic components.

One end of vehicle diagnostic device 100 may include OBD connector 120. OBD connector 120 may include pins designed to interface with an OBD port, such as an OBD-II port, of a vehicle. Vehicle diagnostic device 100 may also include a lanyard mount 130. A cord or other similar attachment material may be inserted through lanyard mount 130 to allow a user to conveniently carry vehicle diagnostic device 100.

In one implementation, electronic components of vehicle diagnostic device 100 may be assembled as a combination of electronic printed circuit boards (PCBs) or other separately manufactured components. For example, in order to reduce device testing and regulatory approval, an existing consumer grade OBD diagnostic component may be mounted within rugged housing 110. Additionally, an existing consumer grade sensing component, such as one that includes a microphone, speaker, and/or wireless transceiver, may also be mounted within rugged housing 110. These electronic components are conceptually illustrated in FIG. 1 using rectangles with dashed lines to illustrate possible mounting locations for these components. As shown, vehicle diagnostic device 100 may include diagnostic component 140, which may be located near the rear of rugged housing 110 (i.e., farthest away from OBD connector 120), and sensing component 150, which may be located near the front of rugged housing 110. Internal OBD connector 160 may be fixed within rugged housing 110 in order to act as a receptacle for diagnostic component 140. In this manner, assembly of vehicle diagnostic device 100 may include insertion of diagnostic component 140 into internal OBD connector 160.

Figure 2:
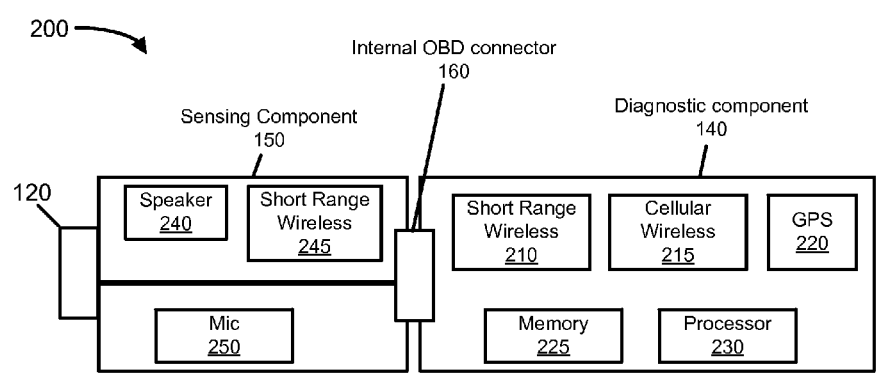
FIG. 2 is a block diagram conceptually illustrating an example of electronic components included as part of a vehicle diagnostic device.

FIG. 2 is a block diagram conceptually illustrating an example of electronic components 200 included as part of vehicle diagnostic device 100. The electronic components shown in FIG. 2 may be included within rugged housing 110.

As illustrated, diagnostic component 140 may include short range wireless component 210, cellular wireless component 215, Global Positioning System (GPS) component 220, memory 225, and processor 230.

Short range wireless component 210 may include an antenna, radio transceiver circuitry, and/or other circuitry to implement a short range wireless connection. A short range wireless connection may include a wireless connection formed over an unlicensed frequency band (i.e., a frequency band that may be legally used without requiring a license from an applicable government entity). Examples of possible short range wireless networking technologies, which may be implemented by short range wireless component 210, include WiFi (i.e., IEEE 802.11-based technologies), Bluetooth®, or other wireless technologies.

Cellular wireless component 215 may include an antenna, radio transceiver circuitry, and/or other circuitry to implement a radio interface with a wireless cellular network. A wireless cellular connection may include a wireless connection formed over a licensed frequency band (i.e., a frequency band that may be licensed by a telecommunications provider to provide cellular wireless service to customers). Cellular wireless connections may generally include longer connection ranges and wider connection areas than short range wireless connections. Examples of possible cellular wireless networking technologies, which may be implemented by cellular wireless component 215, include a Long Term Evolution ("LTE") based wireless radio access networks, a Code Division Multiple Access ("CDMA") 2000 1× network, a second generation ("2G") wireless network, a third generation ("3G") wireless network, or other wireless technologies.

GPS component 220 may include circuitry or other logic to receive and process GPS signals. GPS component 220 may obtain, or assist in obtaining, a geographic location of vehicle diagnostic device 100.

Memory 225 may include any type of dynamic storage device that may store information and instructions for execution by processor 230, and/or any type of non-volatile storage device that may store information for use by processor 230. Processor 230 may include a processor, microprocessor, or processing logic that may interpret and execute instructions, such as instructions stored in memory 225. Vehicle diagnostic device 100 may perform certain operations relating to one or more processes relating to the obtaining of diagnostic data from a vehicle and externally communicating the obtained data. The processes will be described in more detail below. Vehicle diagnostic device 100 may perform these operations in response to processor 230 executing software instructions stored in a computer-readable medium, such as memory 225. A computer-readable medium may be defined as a non-transitory memory device.

Although not explicitly shown in FIG. 2, short range wireless component 210, cellular wireless component 215, Global Positioning System (GPS) 220, memory 225, and processor 230 may be connected to one another through one or busses. Further, as previously mentioned, in one implementation, diagnostic component 140 may be associated with an existing consumer grade OBD diagnostic component. In an aspect, diagnostic component 140 may include a commercially available diagnostic, or telematics, dongle (typically configured to couple to an OBD-II port of a vehicle) that has been certified by governmental agencies or testing laboratories. The existing consumer grade OBD diagnostic component 140 may be manufactured to be placed in an OBD port of a vehicle. Thus, in some implementations, diagnostic component 140 may terminate using an OBD connector that is designed to be inserted into the OBD port of vehicles.

Internal OBD connector 160 may include a physical OBD connector that may be implemented within rugged housing 110. For example, internal OBD connector 160 may be fixed to rugged housing 110. Diagnostic component 140 may be inserted into internal OBD connector 160 to secure diagnostic component 140 within rugged housing 110. Alternatively, when closed, housing 110 may secure diagnostic component 140 with respect to connector 160. Internal OBD connector 160 may be electrically connected to OBD connector 120 via one or more electrical traces associated with rugged housing 110. The traces that couple connectors 160 and 120 may be disposed on sensing component 150 or rugged housing 110. Alternatively, connectors 160 and 120 may be connected via a multi-conductor cable, which may also electrically couple with sensing component 150 (i.e., the multi-conductor cable may be a Y-connector, or Y-cable). Thus, an existing OBD connector of diagnostic component 140 may integrate the diagnostic component, within vehicle diagnostic device 100, to connector 120, which projects through housing 110.

Sensing component 150, as is illustrated in FIG. 2, may include speaker 240, short range wireless component 245, and microphone (mic) 250. Sensing component 150 may generally function to provide audible information to a user (via speaker 240) and to receive audible information (via microphone 250). Speaker 240 may include an electroacoustic transducer to produce sound, and microphone 250 may include an electroacoustic transducer to sense sound. Short range wireless component 240 may be implemented similarly to short range wireless component 210. That is, short range wireless component 210 may include an antenna, radio transceiver circuitry, and/or other circuitry to implement a short range wireless connection, such as a short range wireless connection based on WiFi, Bluetooth®, or other wireless technologies.

In one implementation, sensing component 150 may be printed circuit board installed within rugged housing 110 in a manner similar to the installation of diagnostic component 140. For example, sensing component 150 may be associated with an existing consumer grade communication element that includes a speaker and microphone, such as a communication element designed to be installed in a visor of a vehicle. Sensing component 150 may include one or more electrical traces to connect OBD connectors 120 and 160. In this implementation, sensing component 150 may act as an electrical connector to facilitate the transfer of OBD communications between diagnostic component 140 and the OBD system of the vehicle. In this situation, sensing component 150 may passively connect diagnostic component 140 to the OBD system of the vehicle without actively sensing or otherwise participating in the OBD communications. To potentially avoid additional circuit traces that may be required to communicatively couple diagnostic component 140 and sensing component 150, diagnostic component 140 and sensing component 150 may communicate via a short range wireless signals (e.g., via Bluetooth® communication sessions implemented between short range wireless component 210 and short range wireless component 245). For instance, sensing component 150 may transmit, using a short range wireless connection, audio signals, received via microphone 250, to diagnostic component 140 and output, via speaker 240, audio signals that are received from diagnostic component 140. Thus, in one implementation, sensing component may directly connect diagnostic component 140 to the OBD system of the vehicle (by connecting OBD connectors 120 and 140) and communicate with diagnostic component 140 using short range wireless signals.

In another possible implementation, sensing component 150 may communicate with diagnostic component 140 via circuit traces and/or sensing component 150 may actively participate in the OBD communications using the electrical traces connecting OBD connector 120 and internal OBD connector 160. In yet another possible implementation, and as mentioned previously, the electrical traces that connect OBD connectors 120 and 160 may be implemented separately from sensing component 150 (e.g., in a second printed circuit board, as wires that are installed between connectors 120 and 160, and/or as electrical traces that are manufactured as part of housing 110).

In other implementations, vehicle diagnostic device 100 may include other electronic elements, either as part of diagnostic component 140, sensing component 150, or attached to rugged housing 110. For example, vehicle diagnostic device 100 may also include a radio frequency identification (RFID) tag.

Although FIG. 2 illustrates example components that may be included as part of vehicle diagnostic device 100, in other implementations, the components illustrated in FIG. 2 may contain fewer components, different components, differently arranged components, or additional components than those depicted. Alternatively, or additionally, one or more of the components illustrated in FIG. 2 may perform one or more other tasks described as being performed by one or more other components of FIG. 2.

As previously mentioned, in some implementations, vehicle diagnostic device 100 may be provided to users through a self-serve vending machine or kiosk. A user may obtain vehicle diagnostic device 100 from the kiosk, insert vehicle diagnostic device 100 into the OBD port of the user's vehicle for diagnostic testing, and then return vehicle diagnostic device 100 to the kiosk. Results relating to the testing, such as whether the user's vehicle passed the test, such an emissions test, may be provided to the user via the kiosk or through speaker 240 of vehicle diagnostic device 100.

Figure 3:
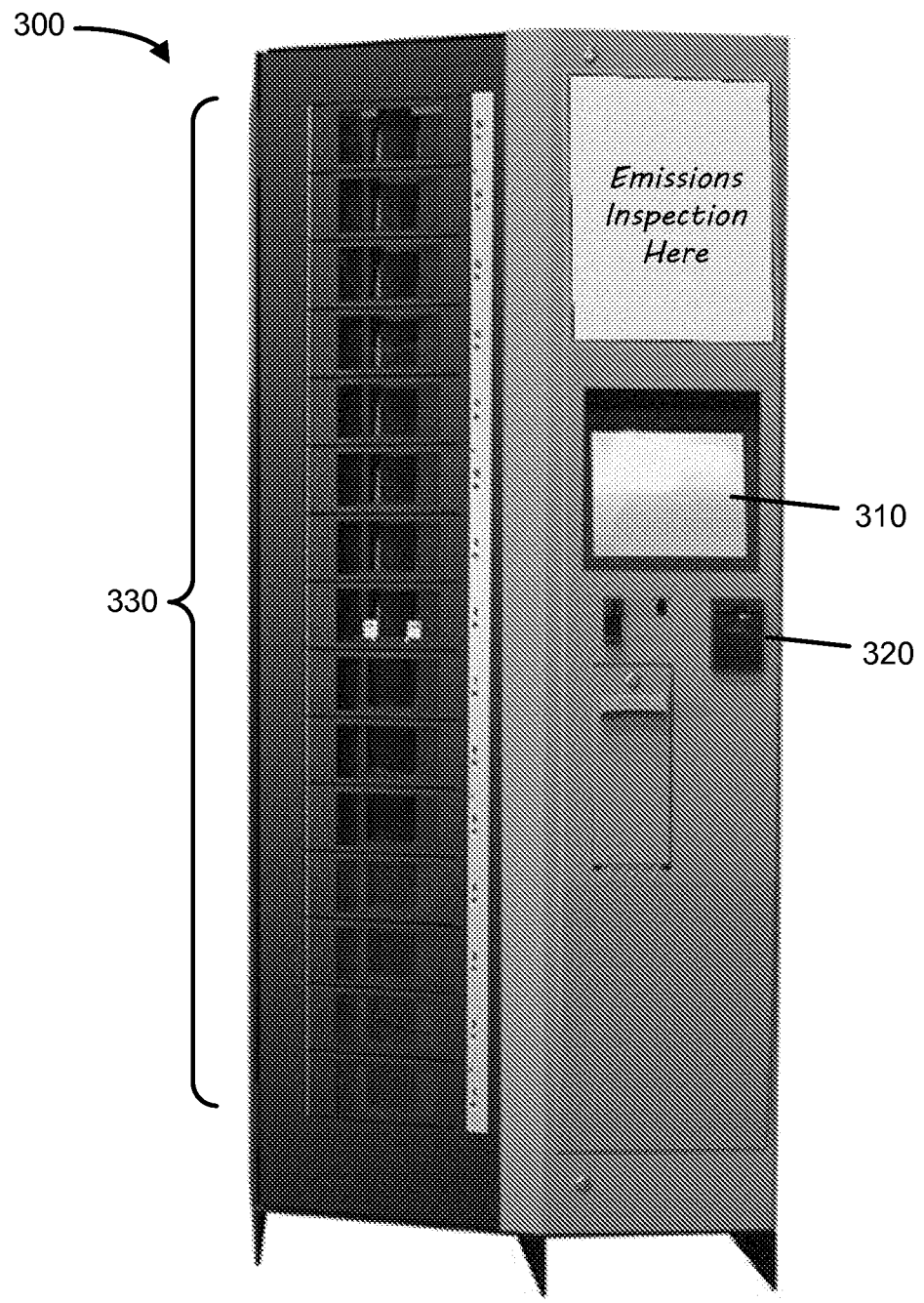
FIG. 3 is a diagram illustrating an example of a self-serve kiosk that may be used to provide diagnostic testing services for users.

FIG. 3 is a diagram illustrating an example of a self-serve kiosk 300 that may be used to provide diagnostic testing services for users. In this example, the diagnostic testing may include testing to determine whether a user's vehicle passes an emission inspection for a particular jurisdiction. Kiosk 300 may be installed, for example, at a retail outlet such as at an automobile mechanic, a gas station, or at another type of retail outlet.

As illustrated, kiosk 300 may include display 310, payment mechanism 320, and dispensing mechanism 330. Display 310 may include a touchscreen display or a non-touchscreen display through which kiosk 300 may provide instructions to a user. In situations in which display 310 is a non-touchscreen interface, kiosk 300 may include additional buttons (or other input elements) through which a user may make selections. As part of the dispensing of vehicle diagnostic device 100, kiosk 300 may take payment from the user. Payment mechanism 320 may include a credit card swiping mechanism, a cash handling mechanism, and/or some other mechanism through which a user may pay for the use of vehicle diagnostic device 100. In some implementations, in order to ensure that the user returns vehicle diagnostic device 100 when the diagnostic test is complete, kiosk 300 may require that a user pay via credit card and may charge a deposit amount to the credit card, which may then be refunded when the user returns vehicle diagnostic device 100. Alternatively or additionally, kiosk 300 may require the user to deposit the user's driver's license and/or some other collateral for the duration of the diagnostic testing.

Kiosk 300 may provide vehicle diagnostic device 100, to a user, via dispensing mechanism 330. As illustrated, dispensing mechanism 330 may include a number of storage compartments, which may each hold a vehicle diagnostic device 100. When kiosk 300 is ready to dispense vehicle diagnostic device 100, a particular storage compartment may be unlocked, allowing the user to remove vehicle diagnostic device 100. The user may similarly return vehicle diagnostic device 100 when diagnostic testing is complete. Removal and return of vehicle diagnostic device 100 may be sensed, by kiosk 300, via RFID tags included as part of vehicle diagnostic device 100. It can be appreciated that in other implementations, other techniques for automatically dispensing vehicle diagnostic device 100 may be used.

Figure 4:
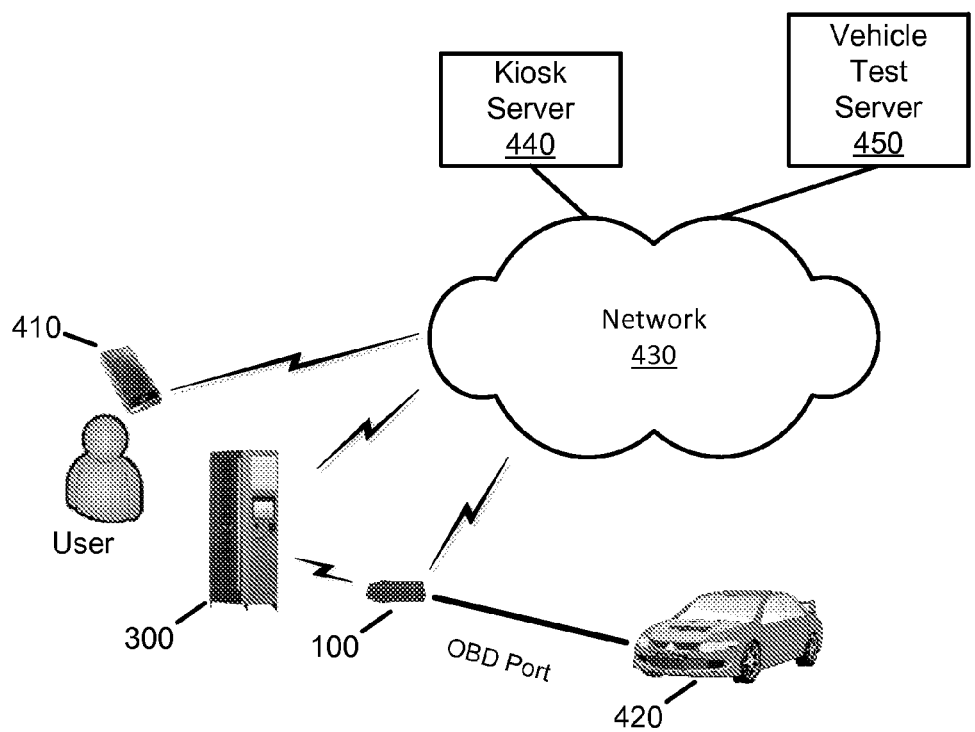
FIG. 4 is a diagram illustrating an example environment in which systems and/or methods described herein may be implemented.

FIG. 4 is a diagram illustrating an example environment 400, in which systems and/or methods described herein may be implemented. As shown in FIG. 4, environment 400 may include kiosk 300, which may dispense one or more vehicle diagnostic devices 100. Vehicle diagnostic device 100 may be used by a user to obtain diagnostic information relating to the operation of a vehicle associated with the user, illustrated as vehicle 420. The user may potentially possess a mobile device 410.

Network 430 may include a wireless network (e.g., a wireless cellular network) with which mobile device 410, kiosk 300, and/or vehicle diagnostic device 100 may communicate. In some implementations, vehicle diagnostic device 100 and kiosk 300 may also communicate with one another, such as via a short range wireless (e.g., Bluetooth® connection). Additionally, although not explicitly shown in FIG. 4, mobile device 410 may potentially also communicate wirelessly with kiosk 300 and/or vehicle diagnostic device 100, such as through an application installed on mobile device 410.

As is further shown in FIG. 4, environment 400 may include one or more servers to provide computing services to mobile device 410, kiosk 300, and/or vehicle diagnostic device 100. The servers may include kiosk server 440 and vehicle test server 450. Although referred to as a "server" herein, kiosk server 440 and vehicle test server 450 may generally include a single computing device, clusters of computing devices (e.g., blades or rack-mounted server computers) that are co-located or geographically distributed, cloud-based (e.g., computing as a service) computing solutions, or other arrangements of computing devices.

Kiosk server 440 may operate to provide services relating to the operation of kiosk 300. Kiosk server 440 may, for example, manage and/or monitor the state of one or more kiosks 300. For example, kiosk 300 may upload, to kiosk server 440, information relating to users that have used the services of kiosk 300. Kiosk server 440 may additionally perform payment related services (e.g., process credit card payments) for kiosks 300, or other functions.

Vehicle test server 450 may store information relating to the results of diagnostic tests performed by vehicle diagnostic device 100. In some implementations, kiosk 300 and/or vehicle diagnostic device 100 may upload vehicle diagnostic information to vehicle test server 450. Alternatively or additionally, instead of vehicle diagnostic information, vehicle test server 450 may simply receive an indication whether a particular vehicle passed or failed a particular diagnostic test. In an implementation in which vehicle diagnostic device 100 is used to perform emission testing for vehicles, vehicle test server 450 may correspond to a server, implemented by a state or other government entity, that stores information relating to the results of emissions tests associated with vehicles.

Figure 5:
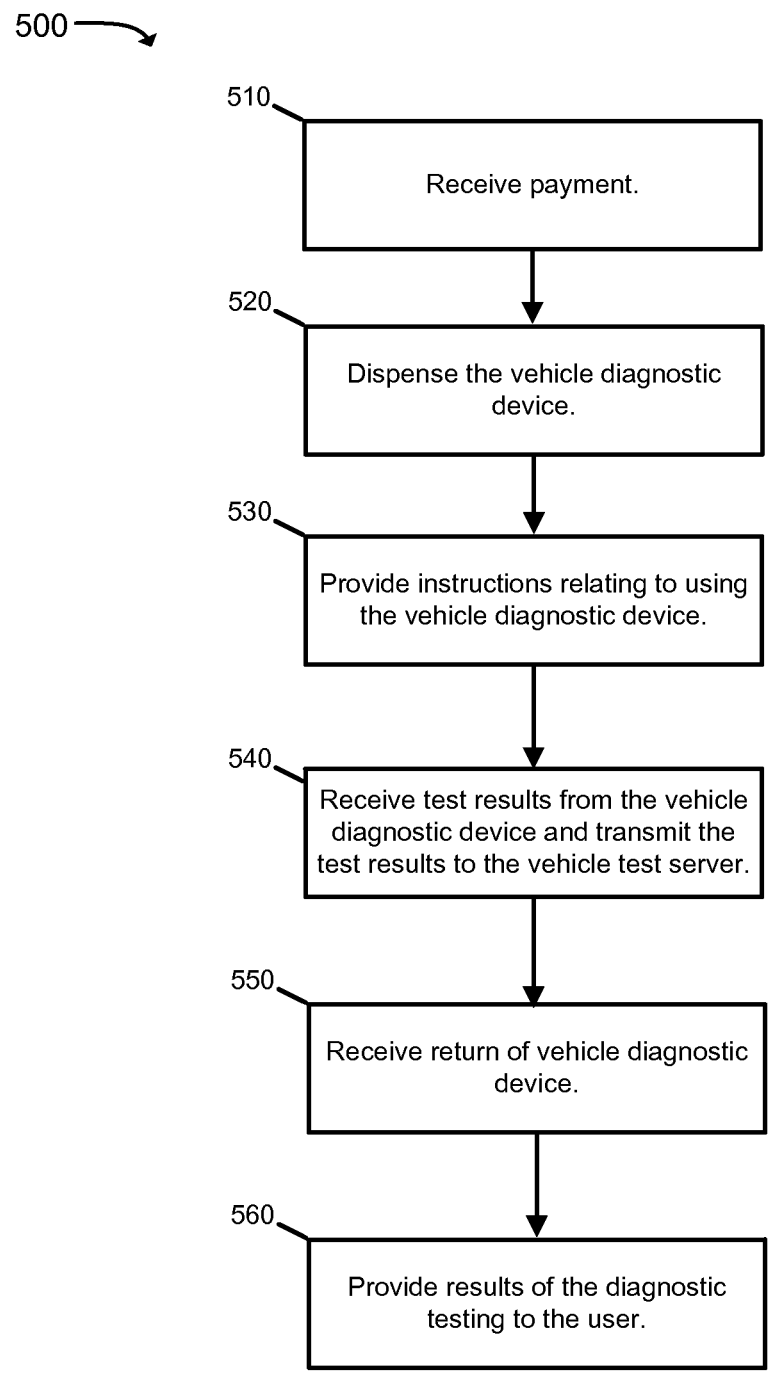
FIG. 5 is a flowchart illustrating an example process relating to self-service vehicle diagnostic testing.

FIG. 5 is a flowchart illustrating an example process 500 relating to self-service vehicle diagnostic testing. Process 500 may be performed by, for example, kiosk 300.

As mentioned previously, kiosk 300 may be located at retail facilities such as gas stations or other retail facilities. Kiosk 300 may allow a user to obtain diagnostic information, and view on analysis of the diagnostic information, on a self-serve basis. In one implementation, kiosk 300 may particularly be designed to perform services relating to vehicle emissions testing.

A user wishing to use the services provided by kiosk 300 may interact with kiosk 300 through, for example, touchscreen display 310. The initial interaction of the user with display 310 may include providing the user with an explanation of the function of kiosk 300 and determining whether the user's vehicle is eligible for self-service diagnostic testing (e.g., based on whether the make and model of the user's vehicle supports OBD diagnostic testing). The user may decide to proceed with self-service vehicle diagnostic testing and may thus provide payment information to kiosk 300. For example, the user may swipe a credit card using payment mechanism 320. Kiosk 300 may receive the corresponding payment (block 510).

Process 500 may further include dispensing vehicle diagnostic device 100 (block 520). For instance, in response to receipt of payment, kiosk 300 may dispense vehicle diagnostic device 100 via dispensing mechanism 330.

Process 500 may further include providing instructions relating to using vehicle diagnostic device 100 (block 530). For example, kiosk 300 may provide instructions to the user, via touchscreen display 310, relating to where to insert vehicle diagnostic device 100 in the user's vehicle as well as any other applicable instructions relating to the use of vehicle diagnostic device 100.

The user may thus proceed to perform the self-service diagnostic testing. In general, performance of the self-service diagnostic testing may include inserting vehicle diagnostic device 100 into the OBD port of the user's vehicle and waiting for vehicle diagnostic device 100 to obtain the diagnostic information. In some implementations, vehicle diagnostic device 100, via speaker 240, may provide additional audible instructions to the user. For example, when vehicle diagnostic device 100 is plugged into the OBD port of the user's vehicle, vehicle diagnostic device 100 may obtain power from the OBD port and begin to perform diagnostic testing of the user's vehicle. Vehicle diagnostic device 100 may issue audible instructions to the user to, for example, indicate when testing is complete or to provide further instructions to the user (e.g., "rev engine", "engage brakes," "testing complete, return device," etc.).

Process 500 may further include receiving test results from the vehicle diagnostic device and transmitting the test results to the vehicle test server (block 540). During diagnostic testing, vehicle diagnostic device 100 may communicate with kiosk 300 (e.g., using short range wireless component 210) to obtain additional instructions and/or to upload results of the diagnostic testing. Kiosk 300 may forward the results of the diagnostic testing (e.g., the vehicle passes or fails emissions inspection) to vehicle test server 450. Alternatively or additionally, in some implementations, vehicle diagnostic device 100 may directly upload the results of the diagnostic testing, to vehicle test server 450, via network 430 (i.e., using cellular wireless component 215).

Process 500 may further include receiving return of the vehicle diagnostic device (block 550). For example, when the user has completed diagnostic testing of the user's vehicle, the user may return vehicle diagnostic device 100 through dispensing mechanism 330. Kiosk 300 may sense the return of vehicle diagnostic device 100 based on an RFID tag included within vehicle diagnostic device 100 or in some other manner. In some implementations, in response to the return of vehicle diagnostic device 100, kiosk 300 may erase or trigger the erasure of any personal information stored in vehicle diagnostic device 100. It situations in which vehicle diagnostic device 100 does not store personal data in non-volatile memory and/or does not store personal data, this erasure operation may not be necessary. The sensing of the return of the device may trigger a credit of a deposit to the user's account that was used when device 100 was dispensed based on an association between the identifier of device 100 and the user's account.

The results of the diagnostic testing may be provided to the user (block 560). For example, kiosk 300 may provide the results via display 310, may email the results to the user, and/or may provide a printout of the results of the diagnostic testing (e.g., a written indication that the user's vehicle passed the emissions test).

Figure 6:
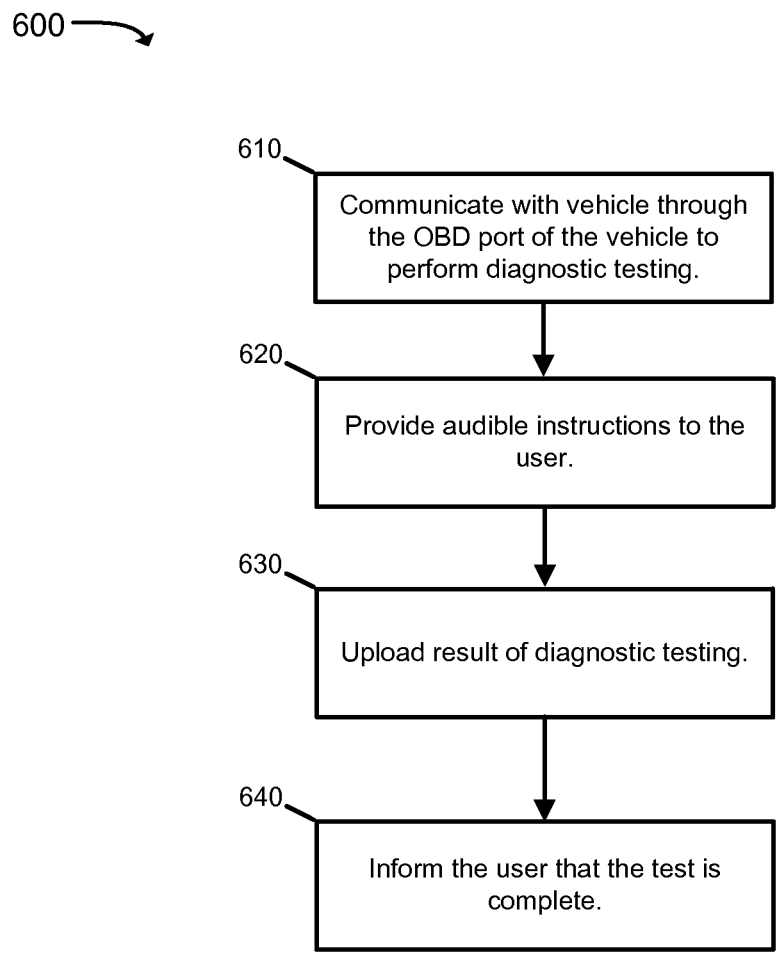
FIG. 6 is a flowchart illustrating an example process for performing vehicle diagnostic testing by a vehicle diagnostic device.

FIG. 6 is a flowchart illustrating an example process 600 for performing vehicle diagnostic testing by vehicle diagnostic device 100. Process 600 may begin when a user inserts vehicle diagnostic device 100 into the OBD port of the user's vehicle. In some implementations, vehicle diagnostic device 100 may be an unpowered device that may receive electrical power through the OBD port. In this situation, inserting vehicle diagnostic device 100 into the OBD port may initiate a power-on sequence and initial operation of vehicle diagnostic device 100.

Process 600 may include communicating with the user's vehicle, through the OBD port of the vehicle, to perform diagnostic testing (block 610). For example, vehicle diagnostic device 100 may receive diagnostic information, such as information relating to the operational state of emission control components (or other components) within the vehicle.

Each vehicle may be associated with a unique Vehicle Identification Number ("VIN"). Vehicle diagnostic device 100 may obtain the VIN of the vehicle as part of the OBD communications. Some vehicles may include OBD processes that do not include the capability to receive the VIN via the OBD port. In this situation, other techniques, described in more detail below, may be used to obtain the VIN.

Process 600 may further include providing audible instructions to the user (block 620). The audible instructions may be provided through speaker 240. For example, processor 230, of diagnostic component 140, may generate the corresponding audible signals and transmit the audible signals to sensing component 150, which may output the audible signals via speaker 240. As previously mentioned, in one implementation, transmitting of the audible signals internally within vehicle diagnostic device 100 (i.e., from diagnostic component 140 to sensing component 140) may be performed wirelessly via short range wireless components 210 and 245. In one implementation, the audible signals may be provided to vehicle diagnostic device 100 from kiosk 300 (e.g., via a Bluetooth® interface established with short range wireless component 245). In this case, kiosk 300 may directly control or direct the operation of the diagnostic testing.

Process 600 may further include uploading results of the diagnostic testing (block 630). As previously mentioned, vehicle diagnostic device 100 may communicate with kiosk 300 (e.g., using short range wireless component 210) and/or vehicle test server 450 (e.g., via cellular wireless component 215) to upload results of the diagnostic testing. The results may include the "raw" diagnostic information received from the user's vehicle and/or an "end" result of the testing, such as whether the vehicle passed an emissions test. In some implementations, the uploaded results may include a geographical location of vehicle diagnostic device 100, such as location information obtained using GPS component 220.

Process 600 may further include informing the user that the test is complete (block 640). In one implementation, vehicle diagnostic device 100 may use speaker 240 to indicate, to the user, that the test is complete. For example, vehicle diagnostic device 100 may generate the audible phrase "test complete, return device to vending machine" to indicate that the test is complete.

In some implementations, mobile device 410 may assist in self-service vehicle diagnostic testing. For example, a user may install an application to mobile device 410. The application may communicate with vehicle diagnostic device 100, kiosk 300, kiosk server 440, and/or vehicle test server 450. For instance, the application may provide additional instructions, relating to the operation of vehicle diagnostic device 100, to the user, such as additional instructions that provide graphic and/or audible guidance relating to the location of the OBD port on the user's vehicles and/or how to operate the user's vehicle during the diagnostic testing.

As previously mentioned, in some situations, diagnostic information obtained from certain vehicles, such as older model vehicles, may not include the VIN of the vehicle. In one implementation, mobile device 410 may be used to obtain the VIN of the vehicle. For example, a user may use a camera associated with mobile device 410 to take a picture of the VIN label that is on the vehicle. The VIN label typically includes a bar code that represents the VIN. Mobile device 410 may upload or analyze the bar code to obtain the VIN of the vehicle.

Figure 7:
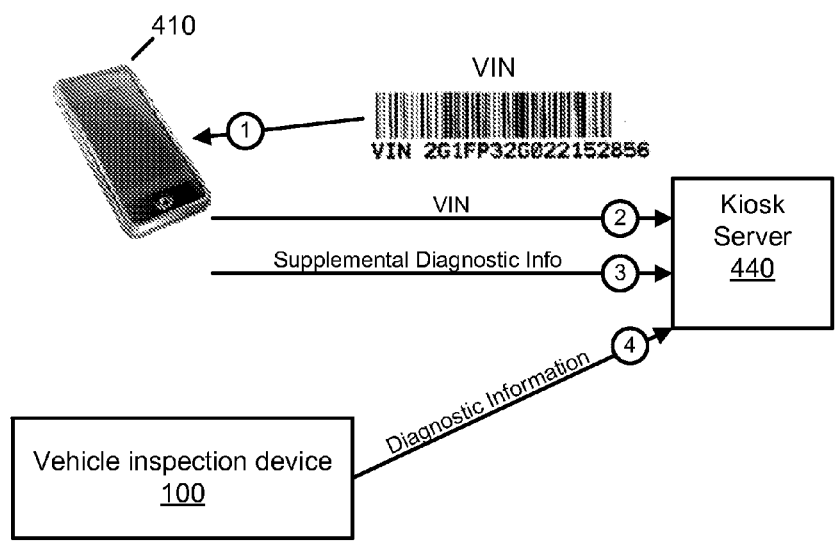
FIG. 7 is a diagram conceptually illustrating an example of using a mobile device to assist in self-serve diagnostic testing.

FIG. 7 is a diagram conceptually illustrating an example of using mobile device 410 to assist in self-serve diagnostic testing. In this example, a user may use mobile device to take a picture of the VIN label associated with the user's vehicle (arrow "1"). Mobile device 410 may analyze the image to obtain the VIN. Alternatively, mobile device 410 may transmit the image to a remote server (e.g., kiosk server 440) to analyze the image. In either situation, the VIN may be determined and transmitted to a server without the user having to type in each digit of the VIN (arrow "2", "VIN").

In some implementations, mobile device 410 may also participate in the process of obtaining diagnostic information. For example, mobile device 410 may record audio information or other information, such as GPS-based location information, during the diagnostic testing process. The additional information obtained by mobile device 410 may also be transmitted to kiosk server 440 as supplemental information (arrow "3", "Supplemental Diagnostic Info"). Vehicle diagnostic device 100 may also upload diagnostic information to kiosk server 440 (arrow "4", "Diagnostic Information"). Kiosk server 440 may correlate the supplemental diagnostic information and the diagnostic information, or otherwise analyze both the supplemental diagnostic information and the diagnostic information, to obtain results relating to the self-serve vehicle diagnostic testing. For example, as part of verifying that the diagnostic system is operating correctly and/or without suspicious activity relating to the user, kiosk server 440 may check that the GPS-based location information from vehicle diagnostic device 100 and from mobile device 410 are consistent with one another.

Figure 8:
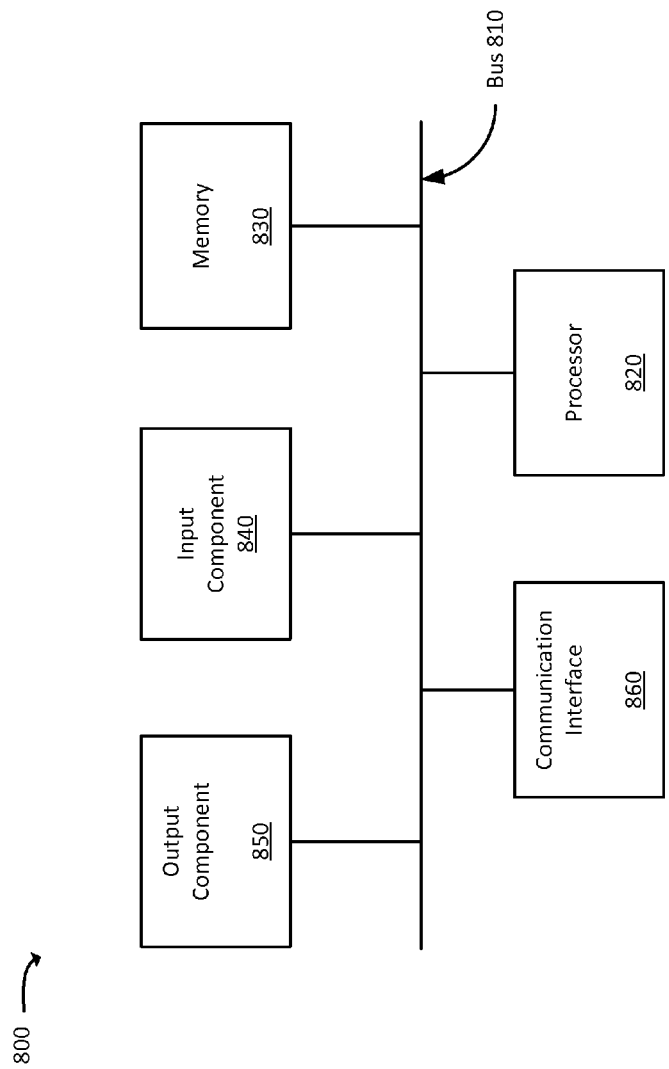
FIG. 8 is a diagram of example components of a device.

FIG. 8 is a diagram of example components of a device 800. One or more of the devices described above (e.g., as described with respect to FIGS. 1-4 and 7) may include one or more devices 800. Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may include processing circuitry to interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes (LEDs), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth® radio, a Wi-Fi radio, a cellular radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 820 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks have been described with regard to FIGS. 5 and 6, the order of the blocks may be modified in other implementations. Further, non-dependent blocks may be performed in parallel. In some implementations, additional blocks may be performed before, after, or in between the described blocks.

Additionally, while series of signals have been described with regard to FIG. 7, the order of the signals may be modified in other implementations. Also, non-dependent signals may be sent and/or received in parallel. In some implementations, additional signals may be transmitted before, after, or in between the described signals.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A vehicle diagnostic device comprising;
   a housing;
   a first on-board diagnostic (OBD) connector internally disposed within the housing such that the first OBD connector is entirely within the housing;
   a second OBD connector that projects through the housing to provide an external interface of the vehicle diagnostic device;
   a diagnostic component coupled within the housing to the first OBD connector, the diagnostic component including:
      one or more memories to store a set of computer-executable instructions, and
      a processor configured to execute the set of computer-executable instructions to:
         communicate, through the second OBD connector, with an OBD port of a vehicle to obtain diagnostic information relating to the operation of the vehicle.

2. The vehicle diagnostic device of claim 1, wherein the housing comprises a rugged plastic container for the diagnostic component.

3. The vehicle diagnostic device of claim 2, wherein the housing internally includes a foam or foam-like material to provide cushioning to the diagnostic component.

4. The vehicle diagnostic device of claim 1, when the diagnostic component further includes:
   a first short range wireless component to communicate over a short range wireless connection; and
   a cellular wireless component to communicate over a cellular wireless connection.

5. The vehicle diagnostic device of claim 4, further comprising:
   a sensing component disposed within the housing, the sensing component including:
      electrical traces connecting the first OBD connector to the second OBD connector,
      a second short range wireless component to communicate over the short range wireless connection,
      a speaker, and
      a microphone, wherein
   the sensing component communicates with the diagnostic component via the short range wireless connection established between the first short range wireless component and the second short range wireless component.

6. The vehicle diagnostic device of claim 5, wherein the sensing component is to:
   play audible instructions, received via the second short range wireless component, using the speaker.

7. The vehicle diagnostic device of claim 4, further comprising:
   a radio frequency identification (RFID) tag associated with the housing.

8. A method, implemented by a vehicle diagnostic device, comprising:
   communicating, by the vehicle diagnostic device, with a vehicle through an OBD port of the vehicle to obtain diagnostic information relating to operation of the vehicle;
   receiving, by the vehicle diagnostic device and via a short range wireless connection, instructions relating to the obtaining of the diagnostic information;
   playing, via a speaker associated with the vehicle diagnostic device, the instructions as audible instructions; and
   transmitting, by the vehicle diagnostic device, the obtained diagnostic information, to a self-serve kiosk,
   wherein the vehicle diagnostic device includes:
      a housing;
      a first on-board diagnostic (OBD) connector internally disposed within the housing such that the first OBD connector is entirely within the housing,
      a second OBD connector that projects through the housing to provide an external interface of the vehicle diagnostic device,
      a diagnostic component coupled within the housing to the first OBD connector the diagnostic component including:
         one or more memories to store a set of computer-executable instructions, and
         a processor configured to execute the set of computer-executable instructions to:
            communicate, through the second OBD connector with the OBD port of a vehicle to obtain diagnostic information relating to the operation of the vehicle.

9. The method of claim 8, wherein transmitting the obtained diagnostic information additionally includes:
   transmitting the obtained diagnostic information, via a cellular wireless connection, to a server coupled to the cellular wireless network.

10. The method of claim 8, wherein the audible instructions include audible instructions indicating that testing of the vehicle is complete.

11. The method of claim 8, wherein the obtained diagnostic information relates to information required to perform a vehicle emissions test.

12. The method of claim 8, wherein the instructions relating to the obtaining of the diagnostic information are received from a self-service kiosk.

13. A vehicle diagnostic device comprising:
   n housing;
   a first on-board diagnostic (OBD) connector internally disposed within the housing such that the first OBD connector is entirely within the housing;
   a second OBD connector that projects through the housing to provide an external interface of the vehicle diagnostic device;
   a diagnostic component coupled within the housing to the first OBD connector, the diagnostic component including:
      one or more memories to store a set of computer-executable instructions, and
      a processor configured to execute the set of computer-executable instructions to:
         communicate, through the second OBD connector, with an OBD system of a vehicle to obtain diagnostic information relating to the operation of the vehicle.

14. The vehicle diagnostic device of claim 13, wherein the housing comprises a rugged plastic container for the diagnostic component.

15. The vehicle diagnostic device of claim 14, wherein the housing internally includes a foam or foam-like material to provide cushioning to the diagnostic component.

16. The vehicle diagnostic device of claim 13, when the diagnostic component further includes:
   a first short range wireless component to communicate over a short range wireless connection; and
   a cellular wireless component to communicate over a cellular wireless connection.

17. The vehicle diagnostic device of claim 16, further comprising:
   a sensing component disposed within the housing, the sensing component including:
      electrical traces connecting the first OBD connector to the second OBD connector,
      a second short range wireless component to communicate over the short range wireless connection,
      a speaker, and
      a microphone, wherein
   the sensing component communicates with the diagnostic component via the short range wireless connection established between the first short range wireless component and the second short range wireless component.

18. The vehicle diagnostic device of claim 17, wherein the sensing component is to:
   play audible instructions, received via the second short range wireless component, using the speaker.

19. The vehicle diagnostic device of claim 16, further comprising:
   a radio frequency identification (RFID) tag associated with the housing.

* * * * *